(12) United States Patent
Burkett et al.

(10) Patent No.: US 9,950,375 B2
(45) Date of Patent: Apr. 24, 2018

(54) SEQUENTIALIZED KEY DUPLICATION SYSTEM

(71) Applicant: The Hillman Group, Inc., Cincinnati, OH (US)

(72) Inventors: Michael Wilson Burkett, Tampa, FL (US); Bradley Roy Miller, Cincinnati, OH (US); Gary Will, Gold Canyon, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 426 days.

(21) Appl. No.: 13/925,379

(22) Filed: Jun. 24, 2013

(65) Prior Publication Data

US 2014/0377027 A1 Dec. 25, 2014

(51) Int. Cl.
*B23C 3/35* (2006.01)

(52) U.S. Cl.
CPC ............ *B23C 3/35* (2013.01); *B23C 2235/12* (2013.01); *B23C 2235/24* (2013.01); *B23C 2235/28* (2013.01); *B23C 2235/41* (2013.01); *Y10T 409/300952* (2015.01); *Y10T 409/301064* (2015.01)

(58) Field of Classification Search
CPC . Y10T 409/300952; Y10T 409/301008; Y10T 409/301064; B23C 3/35; B23C 2235/12; B23C 2235/32
USPC ................ 700/117, 169, 180, 183
See application file for complete search history.

(56) References Cited

U.S. PATENT DOCUMENTS

| 2,148,667 | A | * | 2/1939 | Yoskowitz ............. G07F 11/50 221/122 |
| 3,442,174 | A | * | 5/1969 | Irving et al. .................... 409/83 |
| 3,795,174 | A | * | 3/1974 | Oliver et al. ................... 409/83 |
| 4,666,351 | A |  | 5/1987 | Marchal |
| 4,899,391 | A |  | 2/1990 | Cimino et al. |
| 5,122,018 | A | * | 6/1992 | Zion ............................. 409/81 |
| 5,127,532 | A |  | 7/1992 | Cimino et al. |
| 5,271,698 | A |  | 12/1993 | Heredia et al. |
| 5,351,409 | A |  | 10/1994 | Heredia |
| 5,538,374 | A |  | 7/1996 | Cole et al. |
| 5,617,323 | A |  | 4/1997 | Stansberry et al. |
| 5,660,509 | A |  | 8/1997 | Cole et al. |
| 5,676,504 | A |  | 10/1997 | Mueller et al. |
| 5,711,643 | A | * | 1/1998 | Parr et al. ....................... 409/83 |
| 5,997,224 | A |  | 12/1999 | Beauregard et al. |

(Continued)

FOREIGN PATENT DOCUMENTS

EP 2517826 A1 10/2012

OTHER PUBLICATIONS

Keyme, https://www.keyme.net, 2013, (last accessed Sep. 24, 2013), 16 pages, New York, NY, USA.

*Primary Examiner* — Daniel Howell
*Assistant Examiner* — Yasir Diab
(74) *Attorney, Agent, or Firm* — Finnegan, Henderson, Farabow, Garrett & Dunner LLP (57) ABSTRACT

An integrated key duplication machine includes a machine-based key identification module and a key cutting module. The key identification module is configured to identify a second master key while the key cutting module cuts a key blank corresponding to a first master key. A key blank corresponding to the second master key can be cut on either the integrated machine or a stand-alone machine having only key cutting capabilities.

25 Claims, 3 Drawing Sheets

(56) References Cited

U.S. PATENT DOCUMENTS

| | | | |
|---|---|---|---|
| 6,064,747 A | 5/2000 | Wills et al. | |
| 6,185,311 B1 | 2/2001 | Yanovsky et al. | |
| 6,449,381 B1 | 9/2002 | Yanovsky et al. | |
| 6,543,972 B1 | 4/2003 | Cimino | |
| 6,588,995 B2 | 7/2003 | Wills et al. | |
| 6,647,308 B1 | 11/2003 | Prejean | |
| 6,687,565 B2 * | 2/2004 | Wetterlin et al. | 700/161 |
| 6,801,829 B2 | 10/2004 | Kawai | |
| 6,836,553 B2 | 12/2004 | Campbell et al. | |
| 6,839,449 B1 | 1/2005 | Campbell et al. | |
| 6,839,451 B2 | 1/2005 | Campbell et al. | |
| 6,895,100 B1 | 5/2005 | Pacenzia et al. | |
| 7,065,856 B1 * | 6/2006 | Lemelson | B23Q 41/06 29/563 |
| 7,077,607 B2 | 7/2006 | Foscan | |
| 7,849,721 B2 | 12/2010 | Bass et al. | |
| 7,891,919 B2 | 2/2011 | Bass et al. | |
| 8,074,481 B2 | 12/2011 | Bass et al. | |
| 8,128,322 B2 | 3/2012 | Bass et al. | |
| 8,287,215 B2 | 10/2012 | Freeman et al. | |
| 8,292,556 B2 | 10/2012 | Ryai, Sr. et al. | |
| 8,408,851 B2 | 4/2013 | Hadad | |
| 8,532,809 B2 | 9/2013 | Freeman | |
| 2010/0278437 A1 | 11/2010 | Thompson et al. | |
| 2010/0278438 A1 | 11/2010 | Thompson et al. | |
| 2010/0316250 A1 | 12/2010 | Perrigo | |
| 2011/0176881 A1 | 7/2011 | Bass et al. | |
| 2011/0262240 A1 | 10/2011 | Mutch et al. | |
| 2011/0297691 A1 | 12/2011 | Freeman et al. | |
| 2011/0301738 A1 | 12/2011 | Freeman et al. | |
| 2012/0038453 A1 | 2/2012 | Bass et al. | |
| 2012/0084182 A1 | 4/2012 | Bass et al. | |
| 2012/0243957 A1 | 9/2012 | Drake et al. | |
| 2013/0017030 A1 | 1/2013 | Freeman et al. | |
| 2013/0039714 A1 | 2/2013 | Ryai, Sr. et al. | |

* cited by examiner

SEQUENTIALIZED KEY DUPLICATION SYSTEM

FIELD

The present disclosure generally relates to key identification and cutting systems and related methods, and more particularly, to an integrated key duplication machine capable of identifying one key while simultaneously cutting another key.

BACKGROUND

Various systems of key duplication exist in the marketplace. A typical key duplication process has two aspects: identification of a proper key blank to be selected based on various characteristics of the master key; and cutting the key blank with the bitting pattern of the master key to successfully duplicate the key. Existing systems may automate some or all aspects of this process.

As systems become increasingly automated and customer demand for duplicated keys continues to exist in the marketplace, a rapid, streamlined process becomes essential. Customers demand not only an accurately cut duplicate key, but also that it be done as quickly as possible. Retail establishments that employ key duplication systems as part of their service offerings have an interest in increasing efficiency of their systems and of the employees who operate them and assist customers. Minimizing the time it takes to duplicate a key is important for success because it improves the customer experience and increases the revenue-generating potential of the key duplication system.

Modern key duplication systems may combine the identification and cutting processes in a single, integrated machine. One attempt at combining key identification and key cutting in the same machine is described in U.S. Pat. No. 7,891,919 (the '919 patent) issued to Bass, et al. on Feb. 22, 2011. In particular, the '919 patent describes a system in which a customer supplies a master key to be duplicated, and inserts the master key into a slot on the housing of the machine. The key is secured, and the machine captures an image of the blade of the master key. Internal logic determines which key blank corresponds to the master key and may indicate to the customer which key blank to select. The operator retrieves the corresponding key blank, removes the master key from the slot in the machine, and inserts the key blank into the same slot. The machine then cuts the key blank based on the captured bitting pattern from the master key and provides the completed duplicated key to the operator.

Although the combined key identification and key cutting system of the '919 patent may assist an inexperienced operator in duplicating a key, the disclosed system is limited. That is, the combined key identification and key cutting system of the '919 patent cannot identify a second key while a first key is being cut on the machine. The system of the '919 patent cannot begin the identification of a second master key until duplication of a key blank corresponding to a first master key is completed. This limitation results in an inefficient use of both customer time and employee time in a retail environment. The inefficiency is problematic when a single customer presents multiple keys for duplication or when multiple customers are attempting to have keys duplicated. The key duplication business in a retail environment can be very busy, particularly during weekend hours, and the ability to streamline the process is desirable. Efficiency can be increased by enabling customers to identify keys on one machine while that machine is cutting another key, and then cut the identified keys on a second machine. The process can be optimized even further by providing the retail establishment the capability to prioritize and distribute key duplication tasks across a plurality of key cutting machines within one integrated, networked system.

The disclosed system is directed to overcoming one or more of the problems set forth above and/or elsewhere in the prior art.

SUMMARY

The present invention is directed to an improved sequentialized key duplication machine, key duplication system, and a related method. The advantages and purposes of the invention will be set forth in part in the description which follows, and in part will be apparent from the description, or may be learned by practice of the invention. The advantages and purposes of the invention will be realized and attained by the elements and combinations particularly pointed out in the appended claims.

In accordance with one aspect of the invention, an integrated key duplication machine comprises a machine-based key identification module and a key cutting module. The key identification module is configured to identify a second master key while the key cutting module cuts a key blank corresponding to a first master key.

In another aspect, the invention is directed to a sequentialized key duplication system. The system includes an integrated key duplication machine, comprising a machine-based key identification module and a key cutting module. The key identification module is configured to identify a second master key while the key cutting module cuts a key blank corresponding to a first master key. The system further comprises a stand-alone key cutting machine.

In yet another aspect, the invention is directed to a method of duplicating keys in a sequential manner. The method comprises the steps of: identifying a key blank corresponding to a first master key using a key duplication machine, wherein identifying the key blank comprises capturing an image of the first master key, and comparing the captured image to a plurality of images in a database corresponding to known key blanks; and cutting a bitting pattern into the identified key blank, the bitting pattern corresponding to the bitting pattern of the first master key. As a further step in the method, while the bitting pattern is being cut into the identified key blank, a key blank is identified corresponding to a second master key, wherein identifying the key blank comprises capturing an image of second master key, and comparing the captured image to a plurality of images in a database corresponding to known key blanks.

Additional objects and advantages of the invention will be set forth in part in the description which follows, and in part will be apparent from the description, or may be learned by practice of the embodiments. The objects and advantages of the invention will be realized and attained by the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments and aspects of the disclosed embodiments and, together with the description, serve to explain the principles of the disclosed embodiments. In the drawings.

DETAILED DESCRIPTION

Reference will now be made in detail to various embodiments, examples of which are illustrated in the accompanying drawings. Wherever possible, the same reference numbers will be used throughout the drawings to refer to the same or like parts.

Figure 1:
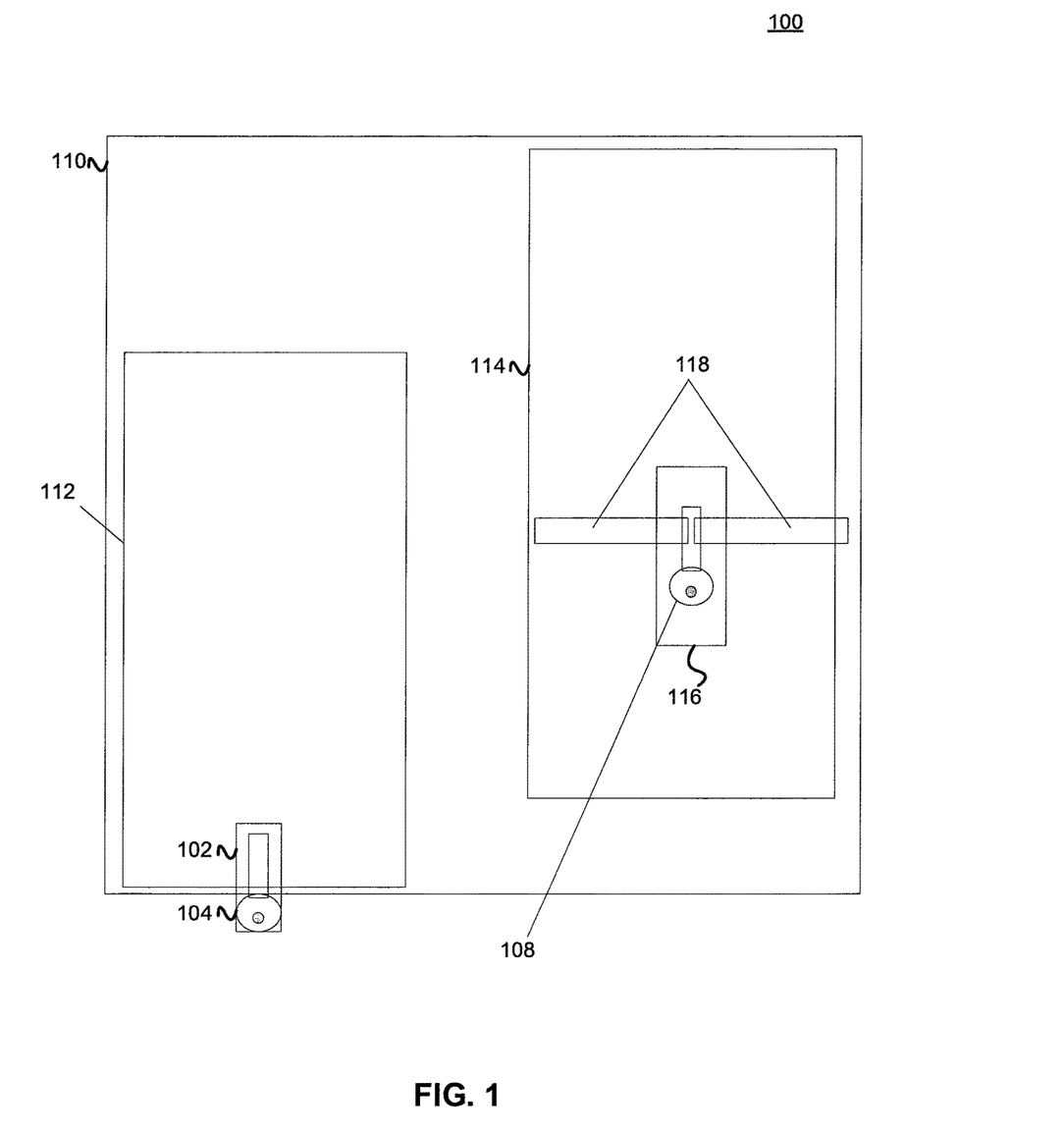
FIG. 1 is a diagrammatic illustration of an exemplary integrated key duplication machine consistent with disclosed embodiments.

FIG. 1 illustrates a top diagrammatic view of an integrated key duplication machine 110. Integrated key duplication machine 110 may comprise both a key identification module 112 and a key cutting module 114. As used herein, "module" is not used in a manner requiring a completely separate modular arrangement. Rather, "module" is used more generally to refer to the components necessary to provide the required functionality. The key cutting and key identification modules may be stand-alone structures capable of being operated individually or they may share common features such as supports, housing, etc. Moreover, a single user interface and processor, including all required software and hardware, may be utilized.

Key insertion slot(s) 102 may comprise machine openings on the exterior of key duplication machine 110. Slot(s) 102 may be configured to receive inserted keys, such as master key 104. In some embodiments, slot(s) 102 may be configured to only accept particular types or brands of master keys 104. While slot 102 accepts only the blade of master key 104, it is contemplated that another opening could be utilized and the entirety of master key 104 could be used for identification. In some embodiments, machine 110 may comprise separate slots 102 (or other openings) for a master key to be identified and a key blank to be cut. While a key insertion slot is depicted in the exemplary embodiment, any opening capable of receiving the key may be utilized. The opening can be a variety of different sizes and shapes and may or may not have a door to minimize ambient light entering the machine.

Key identification module 112 may contain machine-based systems or devices permitting machine 110 to identify a proper key blank associated with a received master key, such as key 104, in an automated fashion. In some embodiments, the machine-based system may comprise a machine vision-based system as is known in the art. The machine vision based system may comprise one or more light sources. In some embodiments, the light source(s) may output visible light. In other embodiments, the light source(s) may output infrared, near-infrared, or ultraviolet light. The machine vision based system may further comprise one or more digital cameras, which may be configured to acquire a visual image of the received master key. Additionally or alternatively, the machine-based systems or devices may comprise one or more laser scanners, which may be configured to scan the blade of the received master key. The key identification module may compare one or more captured electronic representations of the master key to information associated with a set of known key blanks to identify a key blank that matches the master key. The key identification module may also capture the bitting pattern of the master key for eventual duplication into the identified matching key blank.

Key cutting module 114 may contain various devices and systems as are known in the art that are configured to cut a key blank identified by key identification module 112, such as key blank 108. Key cutting module 114 may also contain various alignment systems and devices 116 for aligning and positioning a key blank for the cutting process. These devices, whose operation will be described in more detail below, may comprise pins, clamps, springs, or other related devices and mechanisms to facilitate alignment of the key blank in both lateral and longitudinal space.

Key cutting module 114 may further comprise one or more key cutter(s) 118. In some embodiments, key cutters 118 may comprise one or more cutting wheels. In other embodiments, cutters 118 may comprise one or more milling devices. In some embodiments, cutters 118 may comprise a combination of one or more cutting wheels and one or more milling devices. For purposes of illustration, key cutters 118 are diagrammatically shown in FIG. 1 as a set of two cutting wheels, though this is not intended to be limiting and a milling device may also be included.

Key duplication machine 110 may contain a computing system (not shown), which may further comprise one or more processors and one or more internal memory devices. The one or more processors may be associated with control elements of machine 110 that position and operate the various components. The memory devices may store programs and instructions, or may contain databases. Key duplication machine 110 may store information or data generated and/or used by key identification module 112 or key cutting module 114 in the memory devices. Machine 110's computer system may also include one or more additional components that provide communications to other entities via known methods, such as telephonic means or computing systems, including the Internet.

In some embodiments, key cutting module 114 may comprise an electronic trace device. The trace device may be configured to access stored or acquired bitting pattern information from the memory devices, and cut a key blank in accordance with that information. As used herein, the term "electronic trace" is intended to broadly encompass key cutting functionality that does not rely on mechanical tracing of a master key. For example, an electronic trace device may duplicate an image of the master key bitting pattern. As another example, the device may, through a software algorithm, enhance the bitting pattern image to account for wear and conform more accurately to an OEM specification. In alternative embodiments, key cutting module 114 may comprise a mechanical tracing device.

Key identification module 112 is configured to be able to identify a key when key cutting module 114 is operating to duplicate a bitting pattern from a previously identified key blank. In the embodiment of FIG. 1, separate openings are provided for master key 104 and key blank 108 into the key identification module 112 and key cutting module 114, respectively. The software and related electronics of key identification module 112 provide for operation of key identification module 112 while key cutting module 114 is operating.

The above-identified functionality allows for queuing up of identified master keys for future duplication, while at the same time cutting a key blank. Depending upon the length of time it takes to cut the key, a partial identification of a single key may be completed before the cutting process is complete or multiple keys may be identified. As information associated with the bitting pattern and/or information associated with the key blank corresponding to a given master key is gathered, key duplication machine 110 may be configured to store such information within internal memory devices of the computer system. The internal memory devices may be volatile or non-volatile, magnetic, semiconductor, tape, optical, removable, nonremovable, or any other type of storage device or tangible computer-readable medium, including flash memory or other temporary memory devices. The internal memory devices may comprise two or more memory devices distributed over a local or wide area network, or may be a single memory device. In certain embodiments, the memory devices may include database systems, such as database storage devices, and one or more database processing devices configured to receive instructions to access, process, and send information stored in the storage devices.

The queuing up of identified master keys may be advantageous because it allows for active management of the key duplication process. For example, in a busy retail environment, the system may provide for prioritizing of key duplication based on factors such as customer demand or machine availability. If multiple customers require keys to be duplicated and certain customers indicate that they will be in the store for several hours, their key duplication needs can be sequenced behind a customer who will be leaving the store in a few minutes. Such a customer need not leave their keys for an extended period, however. That customer can have their keys identified, be provided a ticket for future pick-up, and return at a designated future time for pick-up. This prioritization of key duplication depending on customer needs can be managed in an automated fashion, or with operator involvement.

Since keys can be sequentially identified, it may be desirable to utilize an indicator that associates the gathered information with the master key being identified. Such an indicator, when commonly understood by multiple machines within a key duplication system environment, may facilitate queuing up of key duplication tasks across multiple machines. The indicator may serve as a label or tag to inform both the system and the user of characteristics of the key, such as ownership (e.g. "Jack's key"), utility (e.g. "Jack's workshop key"), and/or relative place within a sequence (e.g. "#3"). In some embodiments, a user may provide the indicator to key duplication machine 110, such as through a user interface with a keyboard or a touchscreen with a virtual keyboard. In other embodiments, the computing system of key duplication machine 110 may automatically assign an indicator to the master key. In some embodiments, the computing system of key duplication machine 110 may store the indicator along with each piece of information gathered about the master key, such as its corresponding key blank and/or its bitting pattern, to enable key cutting module 114, or a second key cutting machine altogether, to access information associated with the key duplication task via the indicator.

In other embodiments, further elements may be included, such as a graphical user interface device configured to provide a user with information. The graphical user interface device may be configured to display, for example, information about one or more identified master keys. The displayed information may comprise one or more key blanks that correspond to an identified master key. In other embodiments, the information may comprise a set of directions, telling a user to visit a different area of the store to complete the key cutting process. In some embodiments, the displayed information may further comprise the indicator assigned to the master key. In some embodiments, the system may further comprise a printer and a source of paper, and may provide a printed output to the user comprising the information displayed on the graphical user interface, including the indicator. The printed ticket or receipt may contain machine-readable or operator-readable codes which may contain information about the key duplication job (e.g. the indicator, the identified key blank, pricing information associated with the key duplication task, etc.).

The graphical user interface device may be further configured to receive input from the user, such as through a virtual or physical keyboard. Received user input may comprise various user-supplied information about the key duplication task, such as the quantity of duplicate keys desired, a suggested indicator, and/or a desired time of pickup.

In some embodiments, key duplication machine 110 may be configured as a vending machine, and may contain additional components to facilitate full automation of the key duplication process. Such components may include a magazine, housing an inventory of a plurality of key blanks.

Figure 2:
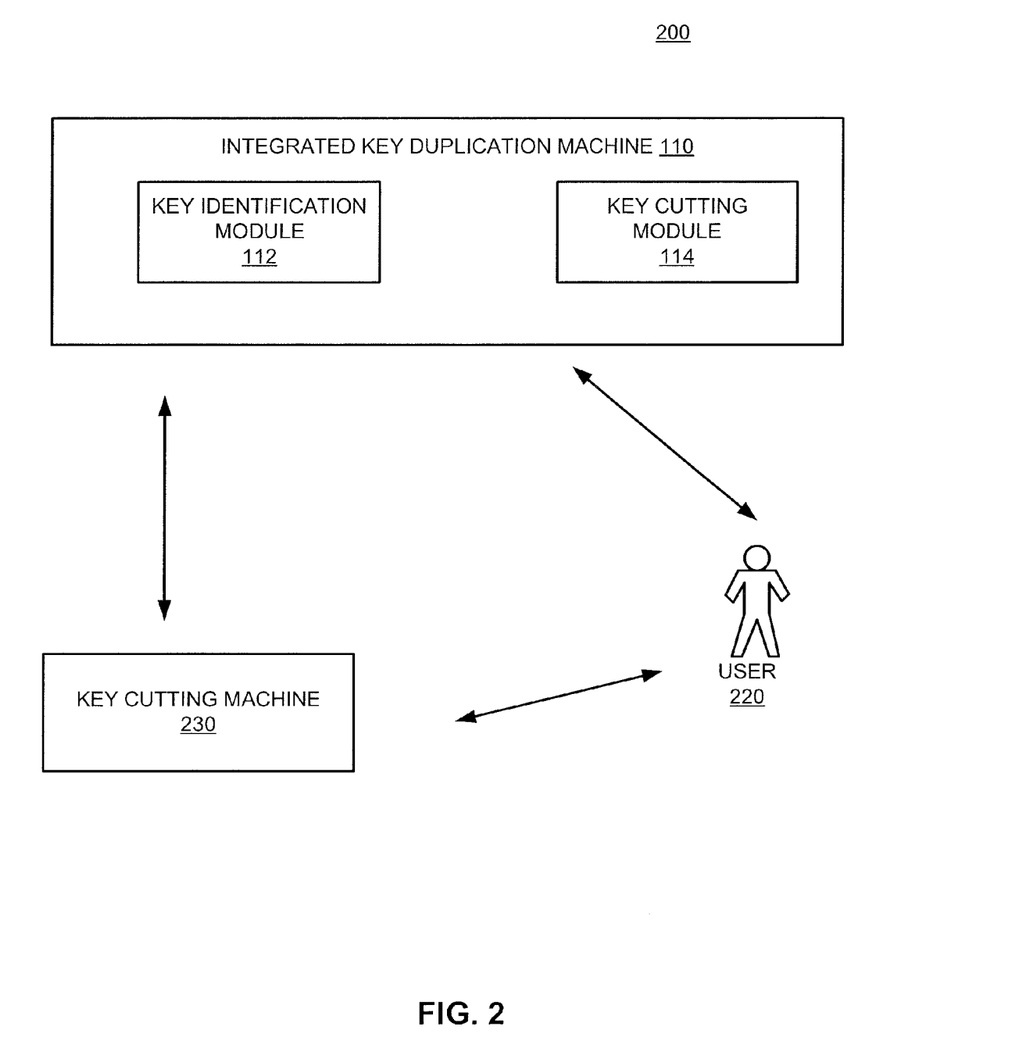
FIG. 2 is a diagrammatic illustration of an exemplary system environment consistent with disclosed embodiments.

FIG. 2 illustrates an exemplary system 200 consistent with disclosed embodiments. In one aspect, system environment 200 may include integrated key duplication machine 110 and stand-alone key cutting machine 230. Key duplication machine 110 may be substantially as described above.

User 220 may represent a customer or potential customer of a retail establishment. In alternative embodiments, user 220 may represent an employee of the retail establishment. User 220 may be untrained or have limited training in aspects of key duplication.

Stand-alone key cutting machine 230 may represent a machine situated within a retail establishment. In some embodiments, key cutting machine 230 may comprise similar components to those described above relative to key cutting module 114. For example, stand-alone key cutting machine 230 may also contain various alignment systems and devices for positioning a key blank for the cutting process. Machine 230 may further comprise one or more key cutter(s), such as cutting wheels or milling devices.

In some embodiments, stand-alone key cutting machine 230 may further comprise a computing system, which may further comprise one or more processors and one or more memory devices. The one or more processors may be associated with control elements of machine 230 that position and operate the various components. The memory devices may store programs and instructions, or may contain databases. Machine 230's computer system may also include one or more additional components that provide communications to other entities via known methods, such as telephonic means or computing systems, including the Internet. Thus arranged, the computing system of machine 230 may be configured to receive information from key duplication device 110, such as information relating to identified key blanks, or information relating to bitting patterns of identified master keys, or information concerning a master key indicator.

In some embodiments, stand-alone key cutting machine 230 may be a tracing machine. Machine 230 may be configured to trace the bitting pattern of a master key onto a key blank. In some embodiments, machine 230 may be an electronic trace machine, and may comprise systems and devices configured to duplicate the bitting pattern using electronic means. In alternative embodiments, machine 230 may be a mechanical trace machine, and may comprise systems and devices configured to physically trace a master key bitting pattern onto a key blank.

Although FIG. 2 describes a certain number of entities and processing/computing components within system environment 200, any number or combination of components may be implemented without departing from the scope of the disclosed embodiments. For example, in some embodiments more than one integrated key duplication machine 110 may be implemented into the system environment. In other embodiments, more than one stand-alone key cutting machine 230 may be implemented. One skilled in the art will appreciate that the entities as described are not limited to their discrete descriptions above. Further, within system environment 200 the computing and processing devices and software executed by these components may be integrated into a local or distributed system. For example, the internal memory of the integrated key duplication machine may be configured to store software instructions that when executed by the computing system may perform one or more functions relating to the combined components in a manner consistent with the disclosed embodiments.

The various components of system environment 200 may be commonly linked to a network for purposes of communication and workflow distribution among the components. The network may be any type of network that facilitates communications and data transfer, such as, for example, a Local Area Network (LAN), or a Wide Area Network (WAN), such as the Internet. The network may be a single network or a combination of networks. Further, the network may comprise a single type of network or a combination of different types of networks, such as the Internet and public exchange networks for wireline and/or wireless communications. The network may utilize cloud computing technologies that are known in the marketplace. One skilled in the art would recognize that the network is not limited to the above examples and that system 200 may implement and incorporate any type of network that allows the entities (and others not shown) included in FIG. 2 to exchange data and information.

The distributed workload functionality of the presently disclosed system may allow for distributing key cutting tasks dependent on machine availability and machine capabilities. For example, various stand-alone key cutting machines may be available in the system. Some may have the ability to duplicate transponder keys. Others may have the ability to cut side-milled keys. Still others may have the ability to cut keys by a manufacturer-assigned code. The system may assign cutting tasks for the previously identified master keys to the cutting machine having both availability and the requisite functionality.

Figure 3:
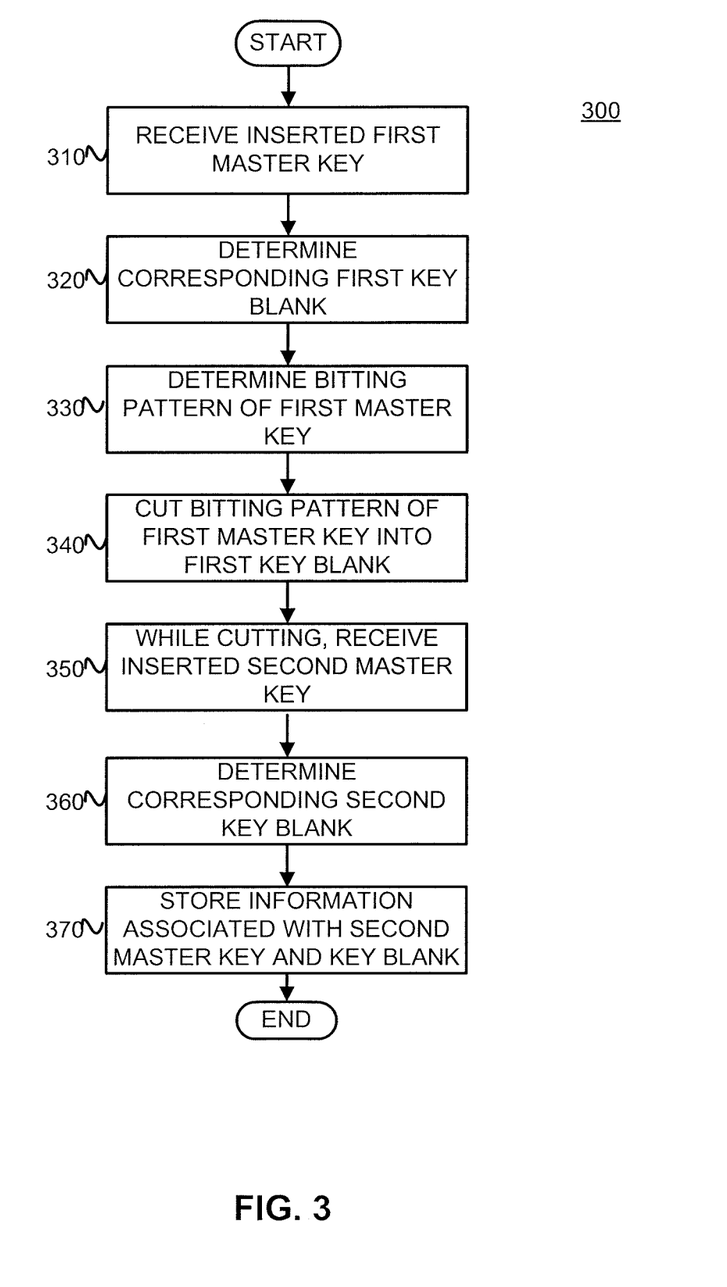
FIG. 3 is a flowchart of an exemplary sequentialized key duplication process, consistent with embodiments disclosed herein.

An exemplary operation of the disclosed systems and devices will now be described. FIG. 3 is a flowchart of an exemplary sequentialized key duplication process 300, consistent with example embodiments disclosed herein. FIG. 3 will be described in connection with the integrated key duplication machine 110, but it is understood that other configurations are possible, such as that described as system environment 200. In one embodiment, key duplication machine 110 may receive an inserted first master key, such as key 104, into key insertion slot 102 (Step 310). Key 104 may be received into machine 110 through slot 102 automatically, via a control, or manually, via insertion by a user.

Key duplication machine 110 may determine a key blank corresponding to the received first master key using the machine-based devices housed within key identification module 112 (Step 320). In some embodiments, key identification module 112 may determine the proper key blank by capturing an image, using a machine vision-based system. In these embodiments, module 112 may capture the image as a digital image using a camera. In other embodiments, an image may be captured using a laser scanner. These examples are not intended to be limiting, and a skilled artisan may contemplate various means of determining the proper key blank corresponding to the inserted master key.

In some embodiments, the computing system associated with key duplication machine 110 may store information associated with a plurality of key blanks in one or more memory devices. Key identification module may compare acquired information associated with the received master key with the stored key blank information to determine the proper key blank. Information to be compared may include, for example, physical characteristics of the master key such as length or width of the key blade. In other embodiments, the compared information may include the position of the shoulder of the key head. In other embodiments, other physical features included in the master key itself may be utilized to determine the proper key blank based on the stored and/or acquired information.

In some embodiments, the first master key 104 may be removed from key insertion slot 102 as soon as the image is captured. In alternative environments, machine 110 may comprise more than one key insertion slot 102, and the first master key 104 may be left in its key insertion slot 102 as long as is desired.

Key duplication machine 110 may be further configured to determine the bitting pattern of the inserted first master key (Step 330). The bitting pattern comprises the cuts in the key blade, and may include notches, depressions, or other such features on one or both edges of the key blade. Alternatively, the bitting pattern may comprise cuts on the broad side of the blade itself, such as those created by a milling machine. Key identification module 112 may determine the bitting pattern of the first master key using similar machine-based systems as described previously. In some embodiments, machine 110 may store the determined key blank information and bitting pattern in a database or memory device included in its computer system. In some embodiments, the bitting pattern information may be output and stored as a series of code numbers defining the desired pattern. Alternatively, the bitting pattern information may be stored as a captured image, such that an exact notch pattern may be subsequently discerned by a key cutting machine or module.

Key duplication machine 110 may proceed to cut the determined bitting pattern of the first master key into a key blank via key cutting module 114 (Step 340). In some embodiments, the key blank to be cut may be supplied manually by a user. In other embodiments, the proper key blank may be supplied automatically, such as from a magazine containing a plurality of key blanks. Prior to commencing cutting of the key blank, key duplication machine 110 may align the first key blank using key alignment system 116 or other features to ensure proper orientation of the first key blank for cutting. Elements of alignment system 116 may be integrated with the key cutter(s) 118, or may be situated independently within key cutting module 114. When the key blank to be cut, such as key blank 108, is introduced into alignment system 116, system 116 may guide blank 108 into the proper lateral position using a series of guide rails, grooves, or other such physical features. Alignment system 116 may further comprise spring-loaded mechanisms that prevent improper insertion and/or provide any necessary alignment.

Alignment system 116 may further employ one or more methods for longitudinally aligning key blank 108. For example, alignment system 116 may contain a tip stop apparatus that engages the tip of blank 108, halting any further longitudinal motion. In other embodiments, alignment system 116 may contain one or more features that contact the shoulder of blank 108. After aligning the key blank in the X and Y directions, alignment system 116 may secure the position of key blank 108 using clamps, pins, or other such devices.

Once the alignment process is complete, key cutter(s) 118 may be translated laterally and longitudinally to cut a bitting pattern into key blank 108 corresponding to the analyzed bitting pattern of the inserted master key. In some embodiments, key cutter(s) 118 may move in unison in a given direction. In some embodiments, key cutter(s) 118 may move independently of one another in a given direction. Depending on the nature of the bitting pattern of the inserted master key, key cutter(s) 118 may cut one or both sides of the blade of key blank 108. If the bitting pattern of the master key requires cutting of both sides of the key blank, key cutter(s) 118 may cut both sides simultaneously, or may cut one side at a time. Alternatively, cutter(s) 118 may cut one side then engage elements of alignment system 116 to flip the key blank to cut the other side. If the bitting pattern of the master key requires only one side of the key blank blade be cut, only one key cutter 118 may be employed. In some embodiments, key cutter 118 may be a milling head and the cutting operation may comprise milling a pattern into the blade of the key blank to match that identified in association with the master key.

Key cutting module 114 may determine the proper bitting pattern to cut into key blank 108 in a variety of ways. Computing system elements of key duplication machine 110 associated with key cutting module 114 may access stored bitting pattern information acquired by key identification module 112. In some embodiments, the stored information may comprise a numeric code readable by the key cutting module that generates a known bitting pattern. Alternatively, key cutting module 114 may comprise an electronic tracing device that may cut blank 108 according to stored information identifying the bitting pattern of the master key 104.

While key duplication machine 110 is in the process of cutting the first key blank, the machine may receive an inserted second master key into key insertion slot 102 (Step 350). The second inserted master key may be the same type or same brand of key as key 104, or the keys may be different. As discussed previously in association with Steps 310 and 320, in some embodiments, there may be multiple key insertion slots 102, and the inserted second master key may be inserted into one of the slots 102 while the inserted first master key may still occupy another slot 102. Alternatively, there may be a single slot 102 associated with machine 110, and the first inserted master key may be removed prior to insertion of the second master key. After receiving the second master key, key duplication machine 110 may determine the key blank corresponding to the second inserted master key (Step 360) using key identification module 112 and various identification and imaging methods described above in association with Step 320. In some embodiments, the computing system of machine 110 may store information relating to the determined second key blank in a database or memory device (Step 370).

The information may be stored for purposes of subsequent cutting of the second key blank by machine 110, or the information may be transmitted to a second machine, such as key cutting machine 230 of system environment 200, such that the second key blank may be cut on another machine while the first key blank is being cut on machine 110. Process 300 may be scaled up to accommodate multiple keys. In some embodiments, a plurality of master keys may be identified subsequent to initiating the cutting of the first master key bitting pattern into the first key blank. The identified plurality of master keys may be maintained in a queue and prioritized for cutting based upon one or more predetermined factors. In some embodiments, the predetermined factors may include a customer provided timing request. In some embodiments, the predetermined factors may relate to machine availability within a system of key cutting machines, such as system environment 200. A user may direct the queued up master keys to be cut upon specific machines within a system of key cutting machines (such as system environment 200) based on the prioritization and the predetermined factors.

As described above, in some embodiments, the master key bitting pattern information and/or key blank information stored in memory during Step 370 may be provided to a remote machine, such as key cutting machine 230, in order to duplicate the second key in a more efficient and convenient manner. Integrated key duplication machine 110 may be configured within a system environment 200 to provide the key blank information and/or bitting pattern information corresponding to the second key to a second key cutting machine, such as key cutting machine 230. In some embodiments, providing the information may occur via networked communications as described above. The various key cutting machines in a system of key cutting machines (such as system environment 200) may all be connected to a common network, and a user may communicate directions for cutting queued up master keys upon specific machines in the system over the network.

In some embodiments, key cutting machine 230 may be a mechanical trace machine. In this situation, a user interface device associated with the integrated key duplication machine may be configured to provide a user with information about the identified second master key. The user can then obtain the proper key blank and proceed with cutting that blank on key cutting machine 230.

Multiple sets of bitting pattern information and/or key blank information may be provided to key cutting machine 230. In some embodiments, each set of information may be individually linked to an indicator in internal memory devices of the computing systems of machines 110 and 230 corresponding to the master key from which it was derived, as described above. Key cutting machine 230 may access the information using the indicator, and proceed to cut a proper key blank with the second master key bitting pattern in a manner similar to that described above in association with machine 110 and the first key blank. In some embodiments, further information may be associated with the indicator to further optimize the key duplication process within a retail establishment. For example, integrated key duplication machine 110 may receive an input via the associated user interface device indicating a time when the completed duplicated key should be provided to the user. In other embodiments, priority data may be associated with the indicator. For example, if one customer indicates at the time of identification that they need their key duplicated by a certain time, the desired time of pick-up and/or a relative position within a system queue (e.g. "High Priority—Do This One First!") may be associated with the indicator at the time of identification by machine 110. Instructions for further process completion may also be associated with the indicator, such as directions to a specific second machine where a key blank associated with a master key identified by machine 110 may be cut (e.g., machine 230, or a different machine).

Because the integrated key duplication machine 110 has the ability to identify a second master key (and potentially a third, fourth etc.) while a key blank corresponding to a previously-identified master key is being cut, the customer/operator experience in a retail environment will be improved. The customer and store operator will not have to sit idly by while a key is being cut. Rather, they can be engaged in the productive activity of identifying the next key(s) that requires duplication. By speeding up the process, more revenue can also be generated at the key duplication site.

Other embodiments of the invention will be apparent to those skilled in the art from consideration of the specification and practice of the invention disclosed herein. It is intended that the specification and examples be considered as examples only, with a true scope and spirit of the invention being indicated by the following claims.

What is claimed is:

1. An integrated key duplication machine, comprising:
   a machine-based key identification module; and
   a key cutting module,
   wherein the key identification module is configured to identify a plurality of master keys while the key cutting module cuts a key blank corresponding to a first master key, the identified plurality of master keys being maintained in a queue of key duplication tasks and prioritized for cutting based upon one or more predetermined factors, wherein the one or more predetermined factors are selected from the group consisting of machine availability within a system of key cutting machines and the order in which the plurality of master keys are identified.

2. The integrated key duplication machine of claim 1, wherein the integrated key duplication machine is configured to store bitting pattern information associated with the plurality of master keys and information associated with one or more key blanks identified as corresponding to the plurality of master keys in an internal memory.

3. The integrated key duplication machine of claim 2, wherein the stored bitting pattern information and stored key blank information are stored with an indicator associated with the plurality of master keys.

4. The integrated key duplication machine of claim 1, further comprising a user interface device configured to provide a user with information about the identified plurality of master keys.

5. The integrated key duplication machine of claim 1, wherein the machine-based key identification module is a machine vision-based system and includes at least one light source and at least one camera.

6. The integrated key duplication machine of claim 1, wherein the key identification module and the key cutting module have a first and second machine opening to receive a master key and a key blank, respectively.

7. The integrated key duplication machine of claim 1, wherein the machine is a vending machine housing an inventory of key blanks.

8. A sequentialized key duplication system comprising:
   an integrated key duplication machine, comprising a machine-based key identification module and a key cutting module, the key identification module being configured to identify a plurality of master keys while the key cutting module cuts a key blank corresponding to a first master key, the identified plurality of master keys being maintained in a queue of key duplication tasks and prioritized for cutting based upon one or more predetermined factors, wherein the one or more predetermined factors are selected from the group consisting of machine availability within a system of key cutting machines and the order in which the plurality of master keys are identified; and
   a stand-alone key cutting machine.

9. The system of claim 8,
   wherein the integrated key duplication machine is configured to capture the bitting pattern information of the plurality of master keys,
   wherein the integrated key duplication machine is configured to store the bitting pattern information and key blank information associated with one or more key blanks identified as corresponding to the plurality of master keys in an internal memory,
   wherein the stored bitting pattern information and stored key blank information are stored with an indicator associated with the plurality of master keys, and
   wherein the integrated key duplication machine is configured to transmit the stored bitting pattern information and key blank information along with the indicator to the stand-alone key cutting machine.

10. The system of claim 9,
    wherein the stored key blank information is stored with an indicator associated with the plurality of master keys, and
    wherein the integrated key duplication machine is configured to provide an output comprising at least one of the key blank information, the indicator, pricing information, or instructions for further process completion.

11. The system of claim 10, wherein providing said output comprises outputting the information to a user interface device.

12. The system of claim 10, wherein the system further comprises a printer and a source of printing materials, and providing said output comprises printing the information on the printing material.

13. The system of claim 10, wherein providing said output comprises:
    transmitting said information to the stand-alone key cutting machine,
    wherein said information comprises the indicator, and
    wherein the stand-alone key cutting machine may create the queue of key duplication tasks listed by their respective indicators.

14. A method of duplicating keys in a sequential manner, comprising:
    identifying a key blank corresponding to a first master key using a key duplication machine, wherein identifying the key blank comprises capturing an image of the first master key, and comparing the captured image to a plurality of images in a database corresponding to known key blanks;
    cutting a bitting pattern into the identified key blank, the bitting pattern corresponding to the bitting pattern of the first master key;
    while the bitting pattern is being cut into the identified key blank, identifying a plurality of master keys, wherein identifying the plurality of master keys comprises capturing images of the plurality of master keys, and comparing the captured images to a plurality of images in a database corresponding to known key blanks, the identified plurality of master keys being maintained in a queue of key duplication tasks and prioritized for cutting based upon one or more predetermined factors, wherein the one or more predetermined factors are selected from the group consisting of machine availability within a system of key cutting machines and the order in which the plurality of master keys are identified.

15. The method of claim 14, wherein identifying the key blanks corresponding to the first master key and the plurality of master keys includes the steps of placing the first master key in a machine opening, removing the first master key, and placing the plurality of master keys in the same machine opening.

16. The method of claim 14, further comprising:
storing information associated with the one or more key blanks identified as corresponding to the plurality of master keys in an internal memory;
associating the key blank information with an indicator associated with the plurality of master keys; and
transmitting the stored information, along with the indicator, to a second key duplication machine.

17. The method of claim 14, further comprising identifying the bitting patterns of the plurality of master keys and storing information corresponding to the bitting patterns in an internal memory.

18. The method of claim 17, further comprising:
associating the bitting pattern information with an indicator associated with the plurality of master keys;
transmitting the stored information corresponding to the bitting pattern to a second key duplication machine, along with the indicator; and
cutting a bitting pattern into a selected key blank using the second key duplication machine,
wherein the bitting pattern and the selected key blank each correspond to the transmitted information and the indicator associated with the plurality of master keys received by the second key duplication machine.

19. The method of claim 14, further comprising completing the identification of a key blank corresponding to the plurality of master keys before completing the cutting of the bitting pattern into the identified key blank corresponding to the first master key.

20. The method of claim 14, further comprising:
storing information associated with one or more the key blanks identified as corresponding to the plurality of master keys in an internal memory;
associating the key blank information with an indicator associated with the plurality of master keys; and
providing an output comprising at least one of the key blank information, the indicator, pricing information, or instructions for further process completion.

21. The method of claim 14, wherein the one or more predetermined factors include a customer provided timing request.

22. The method of claim 14, wherein a user directs the queued up master keys to be cut upon specific machines in a system of key cutting machines based upon the prioritization.

23. The method of claim 22, wherein the key cutting machines in the system are connected together through a network, and the user direction is communicated over the network.

24. The integrated key duplication machine of claim 1, wherein the one or more predetermined factors further include a customer provided timing request.

25. The sequentialized key duplication system of claim 8, wherein the one or more predetermined factors further include a customer provided timing request.

* * * * *